United States Patent
Tembaak

(10) Patent No.: US 9,425,568 B2
(45) Date of Patent: Aug. 23, 2016

(54) CONNECTOR FOR CONDUCTOR RAILS

(71) Applicant: Paul Vahle GmbH & Co. KG, Kamen (DE)

(72) Inventor: Philip Tembaak, Werne (DE)

(73) Assignee: Paul Vahle GmbH & Co. KG, Kamen (DE)

( * ) Notice: Subject to any disclaimer, the term of this patent is extended or adjusted under 35 U.S.C. 154(b) by 0 days.

(21) Appl. No.: 14/417,840

(22) PCT Filed: May 29, 2013

(86) PCT No.: PCT/EP2013/060999
§ 371 (c)(1),
(2) Date: Jan. 28, 2015

(87) PCT Pub. No.: WO2014/019734
PCT Pub. Date: Feb. 6, 2014

(65) Prior Publication Data
US 2015/0303630 A1    Oct. 22, 2015

(30) Foreign Application Priority Data
Jul. 31, 2012    (DE) .................. 10 2012 106 985

(51) Int. Cl.
   *H01R 4/60*    (2006.01)
   *H01R 25/14*    (2006.01)
   *B60M 1/34*    (2006.01)

(52) U.S. Cl.
   CPC ............ *H01R 25/145* (2013.01); *B60M 1/346* (2013.01)

(58) Field of Classification Search
   CPC .. H01R 25/162; H01R 25/14; H01R 25/145; H02G 5/007

USPC ......................... 439/213, 210, 115
See application file for complete search history.

(56) References Cited

U.S. PATENT DOCUMENTS

| | | | |
|---|---|---|---|
| 2,218,016 A | | 10/1940 | Anderson |
| 2,990,458 A | * | 6/1961 | Mageoch ............... B60M 1/305 104/111 |
| 3,892,299 A | | 7/1975 | Kilburg |
| 3,957,142 A | | 5/1976 | Devolle |
| 4,016,961 A | | 4/1977 | Howell, Jr. |
| 4,018,497 A | * | 4/1977 | Bulanchuk ............... H02G 5/04 174/94 S |
| 4,030,794 A | | 6/1977 | Rozenboom et al. |
| 4,230,388 A | * | 10/1980 | Thierry .................. H02G 5/007 439/210 |

(Continued)

FOREIGN PATENT DOCUMENTS

| EP | 1753096 A2 | 2/2007 |
|---|---|---|
| FR | 2846160 A1 | 4/2004 |

OTHER PUBLICATIONS

Int'l Preliminary Report on Patentability issued Feb. 12, 2015 in Int'l Application No. PCT/EP2013/060999.

(Continued)

*Primary Examiner* — Phuong Dinh
(74) *Attorney, Agent, or Firm* — Panitch Schwarze Belisario & Nadel LLP

(57) ABSTRACT

A conductor rail connector to connect the ends of two conductor rails may have first and second connection elements able to be connected to the conductor rail ends using at least one screw element supported on one side on a first side of a conductor rail end and supported on the other side on the first connection element.

13 Claims, 3 Drawing Sheets

(56) References Cited

U.S. PATENT DOCUMENTS 6,186,296 B1 * 2/2001 Spaak ............... B60L 5/40
                                                                   191/22 R
8,845,350 B2 * 9/2014 Connell ............. G01R 11/04
                                                                   200/61.19

OTHER PUBLICATIONS

Int'l Search Report and Written Opinion issued Jul. 29, 2013 in Int'l Application No. PCT/EP2013/060999.
Search Report issued Jul. 1, 2013 in DE Application No. 10 2012 106 985.9.

* cited by examiner

CONNECTOR FOR CONDUCTOR RAILS

CROSS-REFERENCE TO RELATED APPLICATIONS

This application is a Section 371 U.S. National Stage Filing of International Application No. PCT/EP2013/060999, filed May 29, 2013, which was published in the German language on Feb. 6, 2014, under International Publication No. WO 2014/019734 A1, which claims priority to German Patent Application No. 10 2012 106 985.9, filed on Jul. 31, 2012, the disclosures of which are incorporated herein by reference.

BACKGROUND OF THE INVENTION

The present invention relates to a conductor rail connector to connect the ends of two conductor rails which abut on each other.

Conductor rail connectors serve as electrical and mechanical connectors of conductor rails which abut on each other and which can have a grinding surface, along the current collector of which moveable consumers grind and supply this with electrical energy.

Conventional conductor rail connectors mostly have a connection element, which is pushed, clipped or screwed onto the ends of the conductor rails, in order to connect these mechanically and electrically to each other and to orientate them to be aligned with each other.

BRIEF SUMMARY OF THE INVENTION

The object of the present invention is to provide a conductor rail connector with large contact surfaces such that the transition from one conductor rail to the next forms a low ohmic resistance.

This object is achieved according to the invention with a conductor rail connector having the features as claimed.

The conductor rail connector according to the invention is advantageously distinguished in that it abuts on at least two sides of the conductor rail ends to be connected to each other and is loaded with force or pressed by means of at least one screw element having its contact surfaces against the at least two sides of the conductor rails. Hereby, advantageously, a large contact surface and a good contact between the parts of the conductor rail connector according to the invention and the conductor rails results, whereby the transition resistance is kept low. The heating due to the current flow thus remains advantageously small. In comparison to conventional conductor rail connectors, the conductor rail connector according to the invention can hereby be formed to be advantageously shorter in the conductor rail direction.

The idea of the invention is to press the conductor rail connector against the first side of the conductor rails using a screw connection, on which first side the screw connection is supported, and additionally to use the force of the screw connection using the formation of the connection elements of the conductor rail connector in order to generate a resultant force which presses at least one connection element against a further contact surface, in particular laterally against the conductor rail ends. Using the lateral pressing of the at least one connection element of the conductor rail connector and the pressing against the first side of the conductor rails, these are orientated to be aligned with each other and are securely connected to each other mechanically and electrically.

Advantageously, at least one screw element is provided for each conductor rail end. It is, however, advantageous to arrange several screw elements on each conductor rail end such that a stable connection results.

The resultant force advantageously has a force component which acts transversely to the force direction of the screw connection, whereby at least one connection element is pressed laterally against the conductor rail ends. Advantageously, however, both connection elements have contact surfaces which are pressed laterally against the conductor rail ends by tightening the screw connection or the screw connections.

To achieve the resultant force, advantageously a connection element has a contact surface which is orientated at an angle to the longitudinal axis of the screw connection, said contact surface acting against a contact point of the other connection element. The contact point can advantageously likewise be formed as a contact surface. By means of the screw connection, the contact surface of the one connection element is pressed against the contact point of the other connection element. Due to the angled formation of a contact surface of at least one connection element, the two connection elements are adjusted with respect to each other, transversely to the direction of the longitudinal axis of the screw connection, and converge such that the conductor rails are bordered laterally between their contact surfaces.

Advantageously, both angled contact surfaces of the connection elements which correspond to one another are oriented to be parallel to each other. The angle of the angled contact surfaces should be formed in a range from 10° to 45°. Other angles are, however, also conceivable. The angle should, however, be measured such that a sufficiently large pressing force can be generated by the lateral component of the resultant force.

The connection elements can be produced as extruded profiles in a cost-effective manner. These can be formed to be T- or L-shaped in cross-section, wherein they each have an allocated leg which forms the corresponding contact surface. The length of these legs and the corresponding contact surfaces must be measured such that when tightening the screw connection and for the relative movement of the connection elements with respect to each other resulting from this, sufficient clearance remains transversely to the screw connection axis such that it is ensured that the connection elements can move sufficiently widely relative to one another.

The corresponding contact surfaces can be formed by angled undercuts of the legs which point towards one another.

It is particularly advantageous if the two connection elements are designed to be identical, such that the production and storage costs for the conductor rail connectors according to the invention are kept low.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
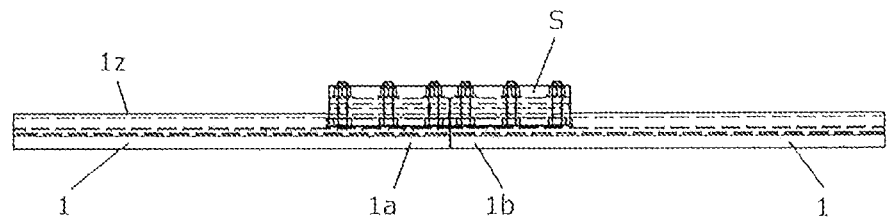
FIG. 1 is a side view of two conductor rails which are connected to each other by means of the conductor rail connector according to the invention.
Figure 2:
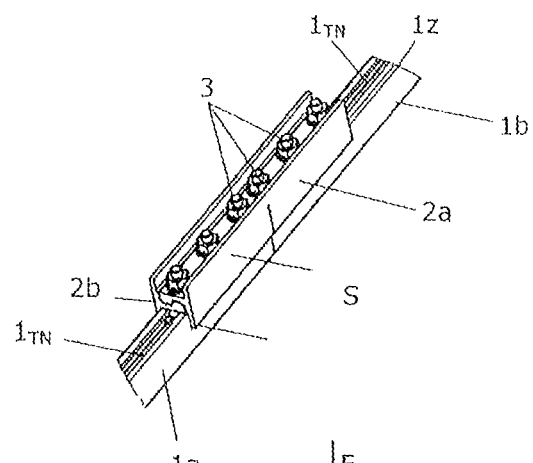
FIG. 2 is a perspective view of the connection point.
Figure 3:
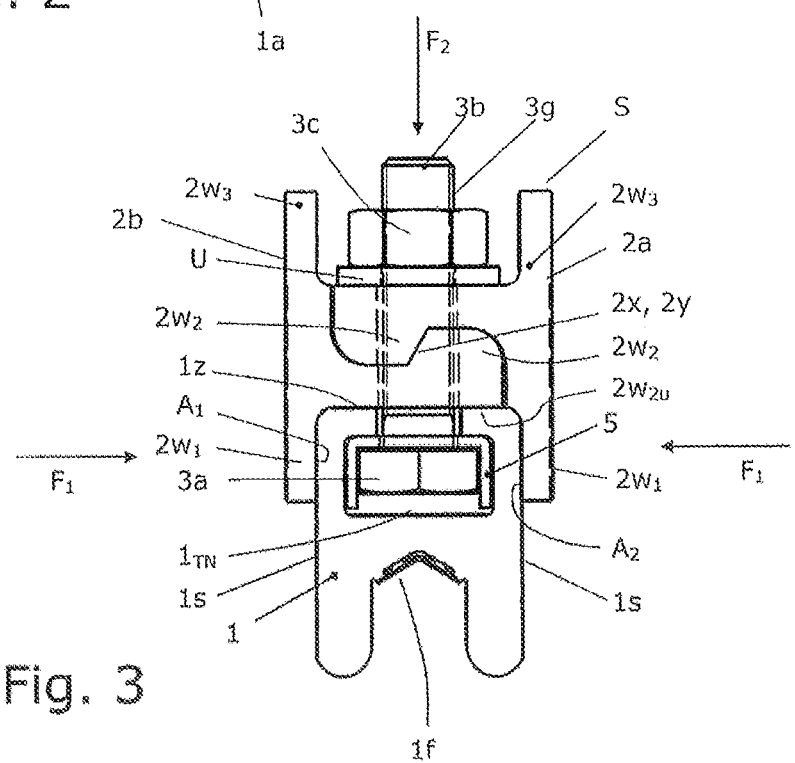
FIG. 3 is a cross-sectional depiction through the end region of a conductor rail and the conductor rail connector which is fixed to it.

FIG. 1 shows a side view of two conductor rails 1, the ends 1a, 1b of which that face each other are connected to each other by means of the conductor rail connector S according to the invention. The conductor rail connector therein lies on the upper side 1z of the conductor rails 1 and is connected to these by means of screw connections 3. As can be gleaned from FIGS. 2 and 3, the screw connections 3 engage with a T-groove $1_{TN}$, which is located on the upper side 1z of the conductor rails 1, and are supported on the inside on the walls of the conductor rail which delimit the opening of the T-groove $1_{TN}$.

The conductor rail connector S has two connection elements 2a, 2b, which are formed as longitudinal profiles and are formed identically in the depicted embodiment. The connection elements 2a, 2b are arranged to be rotated with respect to one another by 180° around their longitudinal axis. A pressing force $F_2$ is generated by means of the screw connection 3, using which the two connection elements 2a, 2b are pressed against each other and abut on one another with their contact surfaces 2x, 2y. Using the angled formation of the contact surfaces 2x, 2y, the two connection elements 2a, 2b are loaded with force in the direction of the forces $F_1$ such that they press against the side walls of the conductor rails 1 with their further contact surfaces $A_1$, $A_2$. Using the force F2, furthermore the connection element 2a is pressed against the upper side 1z of the conductor rail 1 with the lower side $2w_{2u}$ of its wall $2w_2$. The conductor rail connector S thus abuts on three sides 1s and 1z of the conductor rail 1 in the firmly assembled stated.

Figure 4:
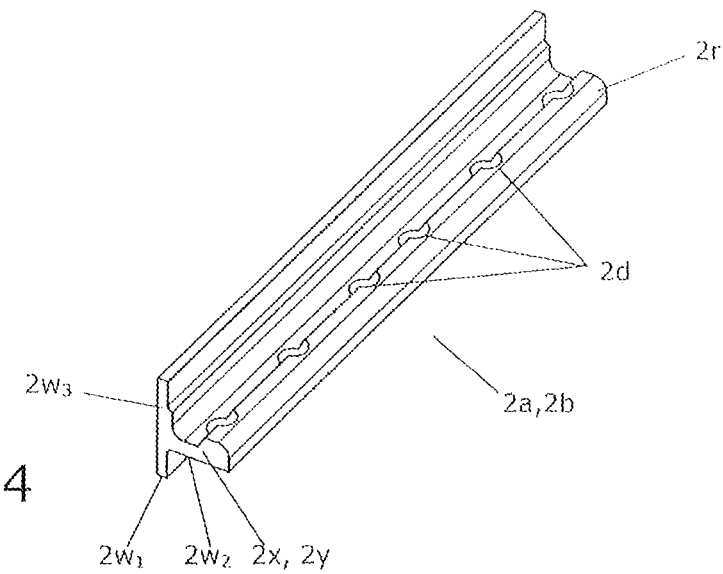
FIG. 4 is a perspective view of a connection element of the conductor rail connector according to the invention.
Figure 5:
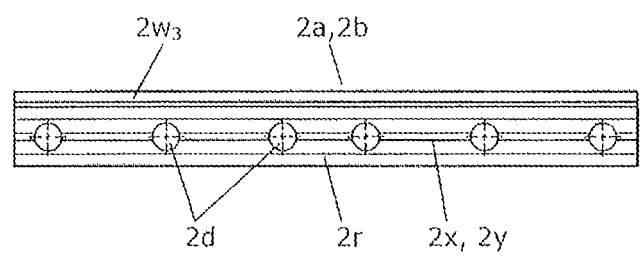
FIG. 5 is a top view onto the connection element according to FIG. 4.
Figure 6:
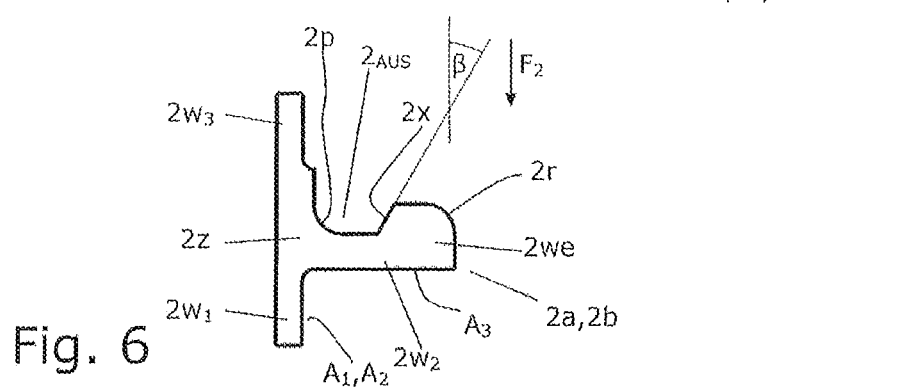
FIG. 6 is a cross-sectional depiction through the connection element according to FIG. 4.

The identically formed connection elements 2a, 2b are depicted in different views in FIGS. 4 to 6. In the cross-section, the connection element 2a, 2b is formed to be approximately T-shaped and consists of the legs $2w_1$, $2w_2$, $2w_3$ and the central region 2z, in which the three legs are connected to one another. The lower leg $2w_1$ forms the contact surface $A_1$, $A_2$ with its one flat side for the lateral contact with the conductor rail. The central leg $2w_2$ forms the contact surface $A_3$ with its lower side, on which either the screw connection is supported or which abuts on the upper side 1z of the conductor rail 1. The upper side of the leg $2w_2$ forms the contact surface 2x, 2y which is positioned at an angle and which is arranged at an angle β to the force $F_2$. The angled contact surface 2x, 2y is formed by the recess $2_{AUS}$ which forms an undercut. The recess $2_{AUS}$ must be formed to be large in such a way that the wall end region 2we of the other connection element has sufficient space such that the connection elements 2a, 2b can be adjusted with respect to one each other so far that a secure contact both on the upper side 1z and on the side walls 1s of the conductor rail 1 results. The round edge 2r of the wall $2w_2$ therein corresponds to the round corner 2p, wherein it must be noted that the edge 2r does not touch the corner 2p.

The connection elements 2a, 2b have a plurality of through-openings 2d, the inner diameter of which is larger than the outer diameter of the screw neck 3b such that the connection elements still have sufficient clearance for their relative movements due to the resultant force, transversely to the force direction of the force $F_2$.

A support element 5 which is u-shaped in cross-section is inserted in the T-groove $1_{TN}$ of the upper side 1z of the conductor rail 1, said support element 5 likewise having through-openings on its base wall for the screw connections 3. The u-shaped support element 5 therein has a width which is larger than the width of the opening $1_{TNÖ}$ (see FIG. 8) of the T-groove $1_{TN}$.

Figure 7:
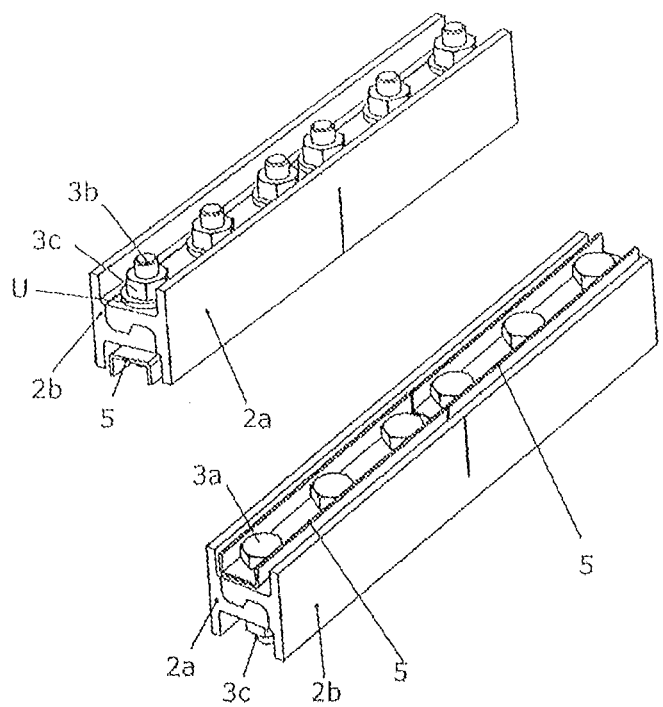
FIG. 7 is an assembled conductor rail connector without a conductor rail.

For the assembly of the conductor rail connector S on the conductor rail ends 1a, 1b, this can be pre-assembled, as is depicted in FIG. 7. FIG. 7 shows an assembled conductor rail connector S without a conductor rail 1, wherein the left upper view shows the conductor rail connector S from above and the right lower view shows the conductor rail connector S from below. The pre-assembled conductor rail connector S can, provided the screw connections 3 are sufficiently loosened, be inserted on the front side into the open T-grooves 1 of the conductor rail with its screw heads 3a and the u-shaped support element 5. As soon as the conductor rail connector S is positioned correctly relative the conductor rail end 1a, it can be pre-assembled on a conductor rail end 1a. After the pre-assembly on the first conductor rail end 1a, it can be inserted into the other conductor rail end 1b, after which then the screws can be tightened firmly and the conductor rail connector is hereby connected firmly to the conductor rail ends 1a and the bus bar ends 1a are orientated with respect to one another.

Of course, for the assembly on the conductor rail end, firstly also only the u-shaped support element 5 having previously inserted screws 3a, 3b can be inserted into the front sides of the conductor rails 1. After the insertion, the screws 3 are held in position in a manner to prevent them from coming loose. As soon as the conductor rails 1 are assembled firmly on their carriers, the connection elements 2a, 2b can be positioned. As the spacing of the through-openings of the u-shaped support element 5 is the same as the spacing of the through-openings 2d of the connection elements 2a, 2b, these can be positioned without problem. Subsequently, only the nuts 3c must be screwed and tightened onto the thread of the screws 3a, 3b with their washers U.

Figure 8:
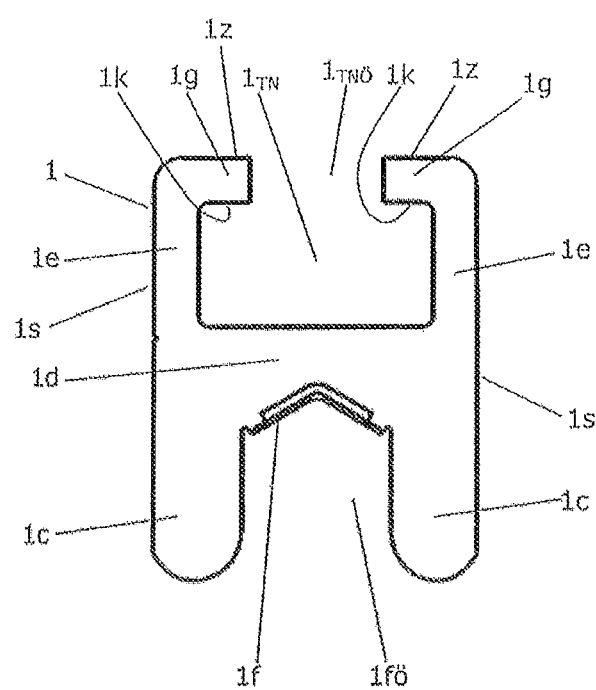
FIG. 8 is a cross-sectional depiction through a conductor rail.

FIG. 8 shows a cross-sectional depiction through a conductor rail 1, which has a T-groove $1_{TN}$ for the connection to the conductor rail connector S on its upper side 1z said connection being formed by the walls 1e and by the collar-like walls 1g, wherein the latter form the opening $1_{TNÖ}$ of the T-groove $1_{TN}$. The lower sides 1k of the walls 1g form the support surfaces for the u-shaped support element 5. The two lower walls 1c which connect to the central section 1d form the opening 1fÖ for the engagement of the current collector, which is not depicted, which slides along the grinding surface 1f with its grinding contact.

It will be appreciated by those skilled in the art that changes could be made to the embodiments described above without departing from the broad inventive concept thereof.

It is understood, therefore, that this invention is not limited to the particular embodiments disclosed, but it is intended to cover modifications within the spirit and scope of the present invention as defined by the appended claims.

The invention claimed is:

1. A conductor rail connector to connect the ends of two conductor rails, the conductor rail connector comprising:
   a first connection element and a second connection element, wherein the first connection element and the second connection element include contact surfaces that correspond to one another, and wherein the first connection element and the second connection element are formed to be identical to each other; and
   at least one screw element configured to connect the first connection element and the second connection element to respective conductor rail ends,
   wherein the at least one screw element is supported on one side on a first side of one of the conductor rail ends and is supported on another side on the first connection element, and wherein the at least one screw element is configured to generate a force pressing the second connection element against the first side of at least one conductor rail,
   wherein at least one contact surface is arranged at an angle to a direction of the force, and
   wherein a resultant force, having a force component, is generated transversely to the direction of the force, due to the force and the angled contact surface, said resultant force pressing at least one connection element with at least one further contact surface of the at least one connection element against the conductor rails in the direction of the force.

2. The conductor rail connector according to claim 1, wherein the first and/or second connection element is a profile part.

3. The conductor rail connector according to claim 2, wherein the first connection element, the second connection element, or both connection elements are formed to be L- or T-shaped in cross-section.

4. The conductor rail connector according to claim 1, wherein the first connection element, the second connection element, or both connection elements have a respective first wall, a side of which forms the further contact surface.

5. The conductor rail connector according claim 1, wherein the first connection element, the second connection element, or both connection elements have a respective second wall, a side of which forms a corresponding contact or contact surface.

6. The conductor rail connector according to claim 1, wherein the contact surfaces of the connection elements are formed in parallel to each other.

7. The conductor rail connector according to claim 1, wherein the contact surfaces are arranged at an angle $\beta$ to the force, wherein the angle $\beta$ is between 10° and 45° in size.

8. The conductor rail connector according to claim 1, wherein the first connection element, the second connection element, or both connection elements have at least one respective window-like through-opening of a bore or of an elongated hole, for the reaching through of the at least one screw means.

9. The conductor rail connector according to claim 1, wherein the first connection element, the second connection element, or both connection elements are made from a conductive material.

10. The conductor rail connector according to claim 1, wherein the screw means is a screw including a screw head, a thread section and a screw nut, wherein the screw head serves as the support on the conductor rail and the connection elements are formed in such a way that the screw nut is able to be tightened by means of a tool, to generate the force.

11. A conductor rail for use with the conductor rail connector according claim 1, wherein the conductor rail has at least one fixing means to anchor the screw means on a first side of the conductor rail that faces towards the conductor rail connector .

12. The conductor rail according to claim 11, wherein the fixing means comprises a T-groove configured to receive a screw head or a screw nut of the screw means or a bore having an inner thread for screwing in the screw means.

13. The conductor rail according to claim 11, wherein the conductor rail has a grinding surface configured for contact with a current collector, two lateral outer walls and one outer wall facing away from the current collector, said outer wall forming the first side for the contact of the one of the connection elements.

* * * * *